(12) United States Patent
Sakrowski

(10) Patent No.: US 7,887,654 B2
(45) Date of Patent: Feb. 15, 2011

(54) BIOCIDE-FREE ANTI-FOULING COATING CONTAINING A FABRIC BASED ON BASALT FIBERS

(75) Inventor: Klaus Dieter Sakrowski, Nordhorn (DE)

(73) Assignee: Unternehmen Für Spezialfasern Sakrowski e.K., Neuenhaus (DE)

( * ) Notice: Subject to any disclaimer, the term of this patent is extended or adjusted under 35 U.S.C. 154(b) by 821 days.

(21) Appl. No.: 10/578,857

(22) PCT Filed: Nov. 9, 2004

(86) PCT No.: PCT/EP2004/012656

§ 371 (c)(1),
(2), (4) Date: May 4, 2007

(87) PCT Pub. No.: WO2005/047403

PCT Pub. Date: May 26, 2005

(65) Prior Publication Data

US 2008/0128069 A1    Jun. 5, 2008

(30) Foreign Application Priority Data

Nov. 13, 2003   (DE) ................ 103 53 185

(51) Int. Cl.
*B63B 5/24* (2006.01)
(52) U.S. Cl. .............. 156/71; 156/94; 114/357; 114/361; 114/67 R
(58) Field of Classification Search ............. 114/357, 114/361, 67 R; 156/94, 71
See application file for complete search history.

(56) References Cited

U.S. PATENT DOCUMENTS

| 4,483,267 | A | * | 11/1984 | Seemann, III | ............... | 114/357 |
| 4,756,265 | A | * | 7/1988 | Lane | ............... | 114/57 |
| 2005/0070182 | A1 | * | 3/2005 | Dunn | ............... | 442/59 |

FOREIGN PATENT DOCUMENTS

| CN | 1424868 | 12/2001 |
| CN | 1 421 351 A | 6/2003 |
| DE | 29 09 148 | 3/1979 |
| DE | 198 57 993 C2 | 12/1998 |
| DE | 198 36 076 | 2/2000 |
| DE | 100 48 671 A1 | 4/2002 |
| EP | 0 903 389 A1 | 3/1999 |
| FR | 2 608 549 A | 6/1988 |
| WO | WO 80/00554 A | 4/1980 |
| WO | WO 96/15198 A | 5/1996 |
| WO | WO 02/086213 A | 10/2002 |

OTHER PUBLICATIONS

Mike Swink, 'Continuous Filament Basalt', Apr. 9, 2002, II What is Basalt?, Basalt Specialty Products, Inc.*
International Search Report in PCT/EP2004/012656 (mailed Mar. 3, 2005) (6 pages).
Bioregion (2003); Ecological ship paint. In BioRegioN Newsletter May 2003, p. 14 (also see www.redaktool.de/k989407180/documents/maL03.764-8.pdf).
Ship-building Society e.V. (1992): STG guildeline No. 2221 "Corrosion protection for ships and maritime construction, Part 3 Servicing Corrosion Protection Systems", Hamburg, pp. 1-36.
Holmstrom and Kjelleberg (1994), "The effect of external biological factors on settlement of marine invertebrates and new antifouling technology", Biofouling, vol. 8, pp. 147-160.
Wahl, Kroger and Lenz, (1998), "Non-toxic protection against epibiosis", Biofouling,, vol. 12(1-3), pp. 205-236.
Daehne et al., (2000), "Alternatives to TBT, Extended Summary, Testing of sustainable antifouling paints on coastal ships in the Lower Saxony Wattenmeer. Final report Phase I and II," WWF, Lower Saxony Ministry for the Environment, Bremen, pp. 2-6 and 169.
Watermann et al., "Performance of biocide-free antifouling paints", Trials on deep-sea going vessels. vol. 111, Inspections and new applications of 2002 nad 2003 and synopical evaluation of results (1998-2003). LimnoMar, Hamburg/Norderney, p. 125.

* cited by examiner

*Primary Examiner*—Jeff Aftergut
*Assistant Examiner*—Jaeyun Lee
(74) *Attorney, Agent, or Firm*—Nash & Titus, LLC

(57) ABSTRACT

The invention relates to the use of mineral fibres or filaments and E-glass fibres having a $SiO_2$ part of more than 50 wt. % in the form of a textile fabric, as a biocide-free antifouling agent for protecting submerged structures from damage by adhesion and multiplication of aquatic pests in the sea or in industrial water systems. The surface of the antifouling agent predominantly consists of fine basalt fibres and the fabric is woven, knitted or braided, a fabric formed according to multiaxial technology, or a nonwoven.

14 Claims, 1 Drawing Sheet

BIOCIDE-FREE ANTI-FOULING COATING CONTAINING A FABRIC BASED ON BASALT FIBERS

Figure 1:
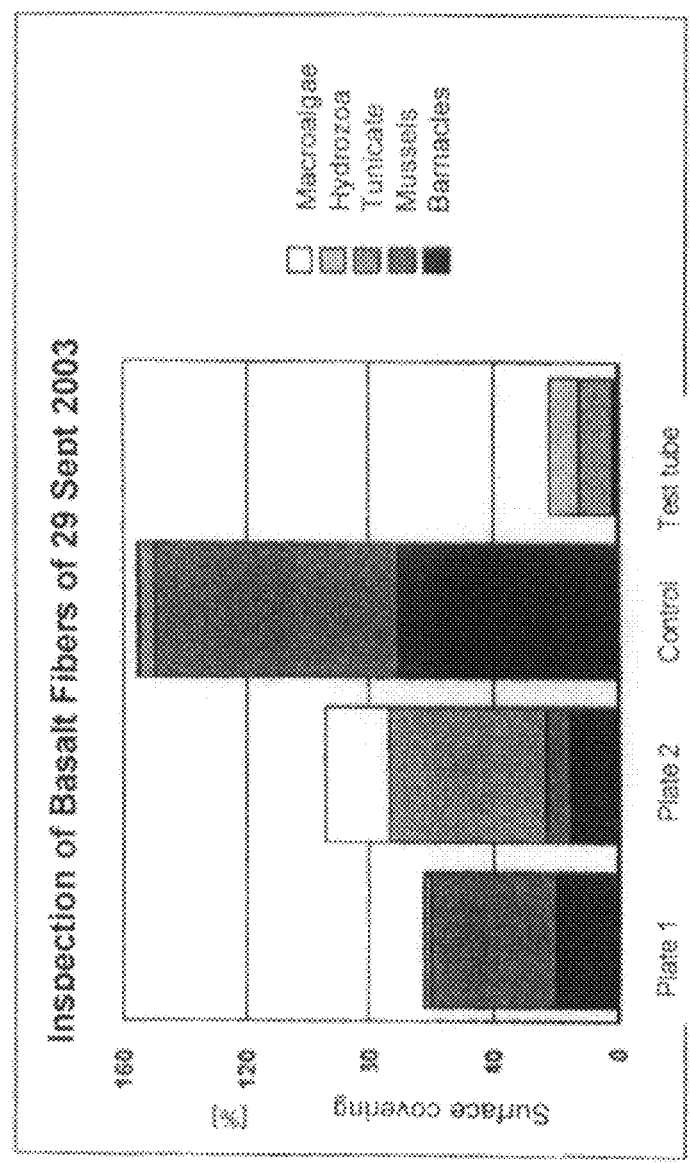

The present invention relates to the use of mineral fibres or filaments and E glass fibres, whereby the fibres or filaments have a $SiO_2$ rate of more than 50% by weight, in the form of a textile fabric as biocide-free antifouling agent for protecting submerged structures from damage due to adhesion and multiplication of harmful organisms living in the water in seawater or in industrial water systems. Surfaces of submerged structures, such as ships, ship nets, buoys, underwater sea cables, navigation guides, jetties or bridges in particular should be protected against harmful organisms living or lying in water or so as to prevent them from becoming attached to these surfaces. These harmful organisms floating in the water or respectively living there are essentially bacteria, single cells, algae, fungi, barnacles and also mussels. Protection comes into question also relative to the so-called shipworm (*Teredo navalis*). This is a mussel, which attacks wooden structures of any kind and also causes extensive damage to wooden ships.

According to the present invention basalt fibres and/or basalt filaments are preferably used.

Solid surfaces in aquatic habitats, so-called hard floors, are normally colonised within a very short period by attached plant and animal organisms. This relates both to the natural hard floors such as rocks, mollusc shells, drift wood, as well as artificial substrates such as for example hydraulic-engineering plants made of wood, metal and synthetics. Societies of organisms on living substrates, for example snail shell or crab armour, are designated as periphytons, that is, epibioses, and on non-living substrates as incrustation.

In aquatic habitats it comes down to protecting surfaces from sticky biopolymers, which initiate a biofouling process.

Biofouling is understood to generally mean the depositing of living organisms onto material surfaces in an aqueous environment, which then negatively influence their physical surface properties. Three types of fouling can be distinguished in the maritime field, namely animals, for example mussels and barnacles, algae, for example green and brown algae and microorganisms, which develop in their preferred habitat.

The typical sequence of colonisation of a fouling community can be described as follows: first, a macromolecular primary film, which favours the adherence of bacteria cells, forms on the ship hull. These bacteria are followed by ptotozoa. The substances discharged by the microorganisms produce a slimy biofilm, which has a predominantly attracting effect on multiplication stages such as larvae and spores of macroorganismen (Honström & Kjellerberg 1994).

There is a basic distinction made here between micro- and macrofouling. Microfouling from microscopically small organisms such as bacteria, single-cell algae (for example diatoms), animal protozoa and aquatic fungi often forms the afore-mentioned biofilm.

Macrofouling comprises multi-cell plant and animal types. An abundance of types and powerfulness in seawater outstrip freshwater umpteen times over and turn fouling into an aggravating problem for marine ship transport.

Examples of plant macrofouling in freshwater are green algae, in seawater likewise green algae, also brown and red algae as well as tube diatoms. The substrate "ship hull" becomes colonised by colony-forming tube diatoms as solitary stem cells as single-cell stages (flagellated zoospores, unflagellated spores, zygotes or fertilised protozoa).

The types of creatures of such macrofouling pass through an early plankton phase, which they sped as larvae in the water. For the transition to the tight mode of living with metamorphosis to the adult form they seek out a hard substrate, attach themselves firmly to it, grow on it and can then form substantial constituents of the fouling community, such as for example barnacles (Balanidae), blue mussels (*Mytilus edulis*), moss animals (*Bryozoa*), sea squirts (*Tunicata*), blooms or corals (*Anthozoa*) or polyps (*Hydrozoa*).

The fouling of underwater hulls of ships primarily causes a loss in navigation speed and secondarily also causes tremendous costs in the form of excess fuel consumption, docking costs, cleaning expenses and fouling protection measures. On the other hand, quantifiable and unquantifiable damage to commercially used and free-living sea organisms has been and is being caused by the use of toxic compounds.

In the maritime environment therefore any surface can experience biofouling, one of the major problems in marine technology.

Special surface coatings, so-called antifouling coatings, should therefore hinder fouling of ship hulls, seawater constructions, such as oil platforms, harbour structures, pipes, navigation guides, jetties and bridges, as well as of other artificial underwater constructions. Known antifouling coatings or respectively antifouling paints are based both on forms of mechanical cleaning and also on releasing toxic biocides from the coating or respectively from the paint, which can be made for example from synthetics or from other coatings.

One of the product groups, whereof the anti-fouling effect is based on physical mechanisms, is the group of fibre coatings. Several systems are in development: there are several types of synthetic fibres, such as for example polyacryl, polyester, nylon fibres, which are sprayed as short individual fibres (0.5-2 mm) onto freshly applied epoxy adhesive. With good application the coatings achieve a satisfactory effect against barnacles, however not against algae. The application is also strongly dependent on external conditions. Wind, rain and low temperatures influence the application outcome more strongly than for other coating types (Daehne et al. 2000, Watermann et al. 2003). In the field of natural fibres trials are currently being conducted with fibres made of hemp (Bioregion 2003). An advantage is the biological degradability of the product. But at the same time this property prevents longer service lives from being achieved. Up to now nothing has been known on the effectiveness of this fibre coating.

For the most part non-stick coatings such as for example Teflon or silicon however also prevent the tacking of fouling substances. By way of example non-stick coatings made of silicon in the Hamburg harbour displayed only minimal or weakly clinging fouling. It was possible to easily clean this off. A specific standard must be adhered to with the application of silicon and underground pre-treatment however so that there is no resulting separation of the system. But since silicon is not degradable, silicon particles are to be removed in breakdowns involving dock waste water and as solid. This also applies for Teflon coatings.

Telfon particles are likewise very difficult to dispose of.

A further distinction is made between insoluble and soluble coatings. Insoluble antifouling coatings are also designated as "contact type" and exhibit high abrasion resistance.

Soluble antifouling coatings are self-eroding and are slowly abraded by flowing water, thus reducing their coating thickness. Depending on the synthetic basis the biocides are rinsed out, presented on the eroding surface or separated off in water. Known antifouling coatings prevent the colonising phase of the fouling process by their biocides, which function as pesticides. With biocides the distinction is made between metallorganic biocides, such as for example the broadband poisons arsenic, copper and tributyl tin (TBT), and natural biocides, used by many maritime organisms to protect their surface against biofouling. Even small concentrations of broadband spectrum toxins cause long-term environmental damage. Tributyl tin (TBT) is known as one of the most toxic chemicals, which might have been utilised as a biocide in the production of underwater ship paints even up to Dec. 31, 2002. After the passing of the Antifouling Convention of the IMO from Jan. 1, 2003 antifouling systems containing organotin may still only be used sealed with sealers. There must be a demonstrably organotin-free antifouling coating on the sealers. TBT-free antifoulings have now already been available on the market for two years and will be offered in the long term. TBT-free self-polishing antifoulings with a service life of 60 months are based primarily on copper and zinc compounds. Yet copper antifoulings guarantee only a maximal fouling duration of 36 months.

Due to stricter legislation within the scope of the aforementioned so-called biocide guideline there is a growing need for non-toxic fouling protection methods.

DE-OS 198 36 076 discloses a biocide-free antifouling coating, based on two components having environmentally neutral self-cleaning properties and providing a hydrodynamic surface with minimal frictional resistance. The antifouling effect is based at the same time on the forming of a surface gel. A gelling agent as a cleaning constituent is used instead of environmentally unfriendly biocides without use of type-averse carrier substances. Preparing the gelling agent is at the same time taken over by a degradable gel matrix as fixing component, which is intermixed homogeneously with the gelling agent in a suspension. Both components are applied to the underwater surface to be protected in a single procedure, and at the same time the flat adhesion is subjected to the turbulent flow. The effect of the cleaning constituents, made available by the degradability of the fixing components constantly on the underwater surface, develops especially on contact with the slimy matter from water or fouling. The fouling matter from the water and the fouling organisms then form a gel on the antifouling coating, which however is not stable in turbulent flow.

Washing off leads to a material loss in both components, by which the coating is slowly applied, so that periodic renewal is required. The material loss is at the same time all the greater, the stronger the recurrent water flows.

EP 0 903 389 A1 furthermore discloses biocide-free antifouling coatings with environmentally neutral self-cleaning and hydrodynamic surface properties for underwater surfaces with undercurrent, whereby this antifouling coating is designed as a dual composite system, in which a fixing component has good binding capacity to the underwater surface and is designed as a pore-forming component in the form of a nanoscaled, sporadic relief of overlapping pores having the parameters of pore size, depth and density; the cleaning constituent is designed as a pore-filling component in the form of a flat cleaning film, whereby the latter is punctured punctiform by individual pore connectors.

The antifouling coating described in EP 0 903 389 A1 exerts its self-cleaning effect however only in the case of forward progress, for example of a ship. As for service lives however the depositing of organic fouling matter is avoided only very minimally, so that the concept of EP 0 903 389 A1, with objects which are firmly located in the maritime environment, has only a very poor effect. The described antifouling coating is also very costly.

CN 1421351 A describes ship hulls made of a textile fabric comprising basalt fibres, modified, that is, impregnated with phenol or epoxy resin and an outer laminated copper film. Deposits of organic fouling matter are achieved by the outer copper layer where possible.

There is therefore a major need in the industry for alternative, non-toxic fouling protection methods.

It is therefore the object of the present invention to provide novel biocide-free antifouling coatings, which substantially reduce or respectively even prevent the fouling of ship hulls, offshore installations, underwater sea cables and other objects found in water.

This task is solved according to the present invention by the use of mineral fibres or filaments and E glass fibres with a $SiO_2$ rate of more than 50% by weight in the form of a textile fabric as biocide-free antifouling agent for protecting submerged structures against damage due to adhesion and multiplication of harmful organisms living in water in seawater or in industrial water systems, whereby the surface of the antifouling agents is formed predominantly by fine basalt fibres.

The inventive textile fabrics can be designed in the form of interlaid scrim, woven fabric, knitted fabrics, or of a fabric designed by the multiaxial technique or as a fleece. In case the inventive fabrics are in the form of a knitted fabric, warp-knitted meshes for aquaculture can be made from basalt fibres. These relatively fine narrow-mesh meshes are constructed from the attachment primarily on snag resistance.

The basic structure of these meshes are so-called right/right warp-knitted meshes. Reference is made in this respect to DE 198 57 993 C2.

In case the inventive fabric is a coating, it can be applied by means of adhesives or other chemically adhesive products to the substrate to be protected, that is, the underwater surface to be protected. Another possibility is that the textile fabric is applied by sheathing and with more-tightly woven fabrics or strips or respectively by networks to the substrate such as for example the surface of ship structures etc.

According to an advantageous embodiment of the invention basalt fibres and/or basalt filaments are used.

The mineral fibres used according to the present invention contain more than 50% by weight $SiO_2$, preferably more than 55% by weight $SiO_2$. The basalt fibres used in a particular embodiment preferably have a high $Al_2O_3$ content, for example a $Al_2O_3$ content of greater than 16% by weight and a low CaO, MgO content, for example a CaO, MgO content of less than 8% by weight, for example between 5 and 8% by weight.

By comparison, the E glass fibres used according to the present invention exhibit a $SiO_2$% by weight of 55% by weight and a $Al_2O_3$ rate of 15% by weight. The CaO, MgO rate is very high, for example between 18 and 24% by weight.

The basalt fibres used according to the present invention are endless basalt fibres and are typically obtained from a basalt melt on an industrial scale and exhibit resistance to temperature of up to 600° C. Methods for manufacturing basalt fibres are described for example in DE 29 09 148 A as well as in DE 35 09 424 A1. The basalt fibres used according to the present invention have thermal resistance in the region of at least ~260° C. to +600° C., have a sintering temperature of 1050° C., a heat coefficient of 0.031 to 0.038K. In physical properties they have a fibre diameter of 7 to 17 μm, and a tex of 28 to 120. The specific weight is 2.6 to 2.8 kg/dm³. The chemical properties after weight loss of 3 hours with processing in boiling water are 1.6%; with processing in 2 nNaOH 2.75% and in 2 n HO 2.2%.

The inventive construction used as antifouling coating is designed in particular as a woven fabric, knitted fabrics or as braiding, or in mulitaxial technique or respectively insertion technique. Additional needle punching of fibres or respectively filaments of fibre materials in the exposed area is likewise possible. The fabric can also be a non-woven fabric of fibres and fibre material, made of basalt fibres.

As mentioned earlier, according to the present invention basalt fibres are considered as suitable materials for warp and weft. In a particular embodiment the inventive woven fabric comprises strands of warp and weft threads interwoven with one another in multilayer form. The warp strand comprises a plurality of individual parallel filaments.

The weft thread strand likewise comprises a plurality of parallel filaments. The individual warp and weft threads lie closely parallel to one another and form a tight woven fabric of minimal thickness. To impart strength to the woven fabric construction, the warp and weft threads were connected in terms of weaving technology at different binding and connection points. Furthermore basket weave or body weave and cross weave are also possible.

The antifouling coating used according to the present invention can be applied to concrete/steel or other constructions such as cables, chains or sails by sheathing with tighter, workable woven fabrics or strips or respectively by braiding or by special knitted fabrics.

Alternatively, the woven-fabric can be applied to the underwater surface being flowed over by means of adhesives, such as for example epoxy adhesives, dual-component adhesives, hot-melt adhesives or with other coatings.

The present invention is based on the surprising discovery that basalt fibre webbing of mussels, barnacles, and also algae is barely fouled.

The basalt fibres used according to the present invention combine two advantages of synthetic and hemp fibres: basalt fibres are a natural product, not subject to any rapid biological decomposition. The raw material is present in large quantities, also making the product relatively cost-effective, since it is one-component manufacturing. The stability is high, compared to chemical and mechanical influences.

The inventive application is embodied in particular in the form of woven mats and not by means of individual fibres, as in the case of synthetic fibres.

At the same time various weaving techniques and woven fabric thicknesses are possible. With the inventive trials a 80 tex woven fabric (plate 1) and a 600 tex woven fabric (plate 2) were first tested. After Initial inspection of these plates a 100 tex woven fabric was also placed into position on a PVC pipe.

The invention will now be explained in greater detail by means of several examples, without however restricting it to the latter.

EXAMPLE 1

Test Plate 1 with 80 Tex Woven Fabric

Plate 1 was provided with a 80 tex woven fabric, which was "stuck" with epoxy adhesive. Because the fibres exhibit an extremely low absorption capacity for water and other fluids, the gelled epoxy soaked through the woven fabric at the surface and hardened there. Through this the fibres at the test surface were almost completely stuck with epoxy. Freely mobile fibres appeared only very few and far between.

Notwithstanding this plate was placed into position naturally on April 24 in the Norderney harbour (Table 1).

EXAMPLE 2

Test plate 2 with 600 tex woven fabric plate 2 was applied and placed into position at the same time (Table 1). Here a heavy 600 tex yarn was applied to find out whether the woven fabric strength influences the effectiveness. Due to this thicker woven fabric less epoxy had come through at the surface. The individual fibres were only partially stuck.

EXAMPLE 3

Test Tube with 100 Tex Woven Fabric

Through the foreseeable difficulties with application of the woven fabric mats to ship hulls a PVC pipe was sheathed in a further test specimen (100 tex). The background of this consideration was the emerging application possibility as fouling protection on underwater cales and pipes, for example in connection with offshore wind power installations. The test mat was attached with double-sided adhesive strips and cable links on the pipe so that the fibres were unable to be glued together. On July 28 this test specimen was placed into position (Table 1).

EXAMPLE 4 AND 5

Test Plates 3 and 4

Due to the difficulties in application of the woven fabric on plates 1 and 2 two further test plates were made. At the same time the woven fabric was stretched loosely around the plates and pressed on with epoxy adhesive strips at 2200. Plate 3 (100 tax single) received on its front side an epoxy strip down the centre under the woven fabric. On the rear side a strip was concealed on the woven fabric. Plate 4 (100 tex als yarn) received on its rear side full surface the epoxy adhesive strips. Both ends of the woven fabric specimen overlap in the plate centre without additional adhesive strip.

Both plates were placed into position on October 1 (Table 1). The primary goal was to check on the durability of the epoxy adhesive strip and of woven fabric using this application method.

TABLE 1

Data of the basalt fibre test sample

| Test object | Test system | Application | Out of storage |
|---|---|---|---|
| Plate 1: 20 × 40 cm | 80 tex woven fabric | April 2003 | 24 Apr. 2003 |
| Plate 2: 15 × 30 cm | 600 tex yarn-woven fabric | April 2003 | 24 Apr. 2003 |
| PVC pipe 11 × 60 cm | 100 tex yarn-woven fabric | July 2003 | 28 Jul. 2003 |
| Plate S: 15 × 30 cm | 100 tex woven fabric | September 2003 | 01 Oct. 2003 |
| Plate 4: 15 × 30 cm | 100 tex yarn-woven fabric | September 2003 | 01 Oct. 2003 |

Test Results

Test Plates

Following 22 weeks of exposure in the Nordemey harbour water plates 1 and 2 and the pipe sample were inspected. At the same time apart from photographic documentation the degree of coverage of the fouling groups was determined according to guideline STG 2221 (Ship-building Society 1992) and taxonomic evaluation of the fouling was made.

Test Plate 1 with 80 Tex Woven Fabric

Plate 1 was strongly fouled after 22 weeks exposure. On September 29 blue mussels covered almost half the test surface and barnacles covered a further 20%. The remaining surface was coated by a relatively thick biofilm. It must be taken into account that the surface was formed for the most part not by the basalt fabric, but by the penetrated epoxy adhesive.

The rear of plate 1 provided only with corrosion protection acted as control. As expected, the fouling here was worse: 70% of the surface was colonised by barnacles. These had secondarily been covered by blue mussels, taking up 80% of the surface.

As a result there was little space remaining for other fouling organisms, tunicates thus covered only 5% of the surface.

Test Plate 2 with 600 Tex Woven Fabric

On this plate the surface was formed predominantly by free basalt fibres. The fouling development was clearly delayed, compared to plate 1. In the photo inspection on July 16 plate 1 was already strongly fouled with mussels, while plate 2 was still free of macroscopic fouling particularly in the middle region (mussels, barnacles, macroalgae) and had only one microalgae biofilm. In an additional photo inspection on August 4 macrofouling had increased, but the middle region of the plate was still free of hard-shelled fouling (mussels, barnacles).

During a final inspection on September 29 tunicate *Styela clava* had colonised in large quantities and covered 50% of the surface.

At the same time it had colonised predominantly epibionthically on barnacles, but also basibionthically on the woven fabric surface. In between the tunicates, mussels and barnacles there were however still areas covered only by microalgae.

Test Tubes with 100 Tex Woven Fabric

The test tube was taken out on July 28 and photographed as agreed on at intervals of 1-2 weeks. The pictures illustrate the development of fouling very graphically. After a week an individual sea anemone (*Metridium senile*) had settled on the basalt fabric. One week later a thin biofilm was visible and young barnacles had colonised here and there. After 4 weeks of exposure the barnacle covering had not increased, but young Hydrozoa had settled. After 5 weeks for the first time tunicate *Botryllus schlosseri* was proven. Two weeks later tunicates of *Moigula citrina* genus had also colonised sporadically. During the penultimate inspection on September 26 after more than 8 weeks of exposure the barnacle fouling was still very minimal (2%). It was also conspicuous that the barnacles were clearly smaller than on the cable connectors of the pipe.

The barnacles evidently have difficulties in colonising and growing on an "intact", mobile fibre substrate.

Blue mussels were not found, caused by the late date when the test sample was placed into position. Blue mussels have a drop in breeding early in the year, which this year failed very markedly. There can still be a weaker drop in breeding in later summer, which this year has seemingly not taken place. In this way Hydrozoe Laomedeaflexuosa (10%) and tunicate *Botryllus schlosseri* (10%) made up the majority of macrofouling. Fifty percent of the surface was free of visible fouling and 25% was covered by microalgae only.

FIG. 1: Periphyton covering [%] of test plates 1 and 2 with monitoring (22 weeks exposure) and of the test tube (8 weeks exposure)

Discussion

Test Plate 1 with 80 Tex Woven Fabric

On test plate 1 (80 tex) the epoxy stuck the fibres together. This prevented an antifouling effect.

Test Plate 2 with 600 Tex Woven Fabric

The 600 tex woven fabric on plate 2 was stuck together on the surface less strongly. The result was delayed and reduced fouling formation in the middle region of the plate.

Test Tube with 100 Tex Woven Fabric

As a first preliminary trial a PVC test tube was sheathed in 100 tex woven fabric and placed into position. This test specimen achieved a very satisfactory result, however with relatively late seasonal placing into position and brief exposure of 8 weeks.

Nonetheless, by means of the fouling on the cable connectors and the anchor it can be ascertained that barnacle fouling was reduced. Hydrozoa colonised in large numbers, but reached no large biomass.

The results of test plate 2 prove that the effect of the basalt fibres is a delay and reduction in fouling development: blue mussels eschew the fibre surface, barnacle colonise in lesser density and are inhibited in their growth.

The antifouling effect of the Inventive basalt fibre fabric is probably caused by the flexibility of the surface. The colony-ready larvae of the fouling organisms recognise the woven fabric not as a stable surface and accordingly avoid it. Since the larvae have only limited time to find a suitable site for colonising, seemingly unfavourable surfaces are colonised if no better alternatives are available.

In conclusion, it can be stated that the present results imply a delay and reduction in fouling.

Apart from the antifouling effect the mechanical stability of the woven fabrics in seawater is an essential pre-requisite for the commercial exploitation. To date there has been no evidence suggesting that the stability of the woven fabrics is not suitable for long-term use in seawater.

LITERATURE

Bioregion (2003): Ecological ship paint. In BioRegioN Newsletter May 2003. page 14. www.redaktool.de/k989407180/documents/maL03.764~8.pdf Holström, C. & S. Kjelleberg (1994): The effect of external biological factors on settlement of marine invertebrate and new antifouling technology. Biofouling, 8: 147-160.

Ship-building Society e. V. (1992): STG guideline No. 2221 "Corrosion protection for ships and maritime construction, Part 3 Servicing Corrosion protection systems", Hamburg, 36 S.

Wahl, M., K. Kröger & M. Lenz (1998): Non-toxic protection against epibiosis. Biofouling, 12 (1-3): 205-236.

Daehne. B., B. Watermann, H. Michaelis, M. Haase & J. Isensee (2000): Alternatives to TBT. Testing of sustainable antifouling paints on coastal ships in the Lower Saxony Wattenmeer. Final report Phase 1 and 11, WWF, Lower Saxony Ministry for the Environment, Bremen, 169 p.+115, see attachment.

Watermann, B., B. Daehne. M. Wiegemann. M. Lindeskog & S. Sievers (2003): Performance of biocide-free antifouling paints, Trials on deep-sea going vessels. Vol 111 inspections and new applications of 2002 and 2003 and syn-optical evaluation of results (19982003). LimnoMar, Hamburg/Norderney, 125 S

The invention claimed is:

1. A method of reducing or delaying damage to submerged structures due to adhesion and multiplication by harmful organisms living in the water in seawater or in industrial water systems, comprising the step of applying to the outside of the structure a biocide-free antifouling agent comprising fine basalt fibers or filaments, or comprising a combination of fine basalt fibers or filaments and E glass fibers, wherein the fine basalt fibers or filaments or E-glass fibers have a $SiO_2$ rate of more than 50% by weight, wherein the antifouling agent is applied in the form of a textile fabric selected from the group consisting of interlaid scrim, woven fabric, knitted fabrics or braiding, a fabric designed by the multiaxial technique, and a fleece, wherein the exterior surface of the textile fabric to be in contact with the seawater or industrial water is formed predominantly by exposed free fine basalt fibers or filaments.

2. The method of claim 1, wherein the fabric is a fishing net which is placed on the substrate or on underwater surfaces.

3. The method of claim 2, wherein the fishing net is a knotless, warp-knitted fishing net suitable for aquaculture or an antifouling coating.

4. The method of claim 1, wherein the textile fabric is applied by means of adhesives or other chemically adhesive products to the substrate or to the underwater surface, or the textile fabric is applied to the substrate or to the underwater surface by sheathing with tightly woven fabrics or strips or by braiding.

5. The method of claim 1, wherein the textile fabric has edge protection along its edges.

6. The method of claim 1, whereby the woven fabric comprises warp and weft threads, in each case basalt fibers.

7. The method of claim 1, whereby roving and yarns with a fineness of 50 to 3000 tex, are used for the woven fabric and the woven fabrics produced form the yarns have a surface weight of 70 to 1500 $g/m^2$.

8. The method of claim 7, whereby roving and yarns with a fineness of 50 to 500 tex, are used for the woven fabric.

9. The method of claim 7, whereby the woven fabrics produced form the yarns have a surface weight of 90 to 200 $g/m^2$.

10. The method of claim 1, whereby the woven fabric comprises several coats or layers and is fastened mechanically in terms of weaving technology with quilting seams, whereby the quilting seams are executed using a sewing cotton.

11. The method of claim 1, whereby the layers of the textile fabric are connected to one another by means of adhesion technology.

12. The method of claim 11, wherein the layers of the textile fabric are connected to one another by means of welding adhesive tape and/or by means of adhesive powder.

13. The method of claim 1, whereby the textile fabric material comprises yarns or multiyarns.

14. The method of claim 1, whereby the textile fabric, prior to use as an antifouling agent, is subjected to a texturing process.

* * * * *